US008859036B2

(12) United States Patent
Papagianakis

(10) Patent No.: US 8,859,036 B2
(45) Date of Patent: Oct. 14, 2014

(54) METHOD OF MAKING METAL-TREATED PARTICLES OF SPECIFIC SURFACE AREA FOR REMEDIATION

(75) Inventor: Peter Papagianakis, Greenwood Lake, NY (US)

(73) Assignee: Crane Company, Stamford, CT (US)

( * ) Notice: Subject to any disclaimer, the term of this patent is extended or adjusted under 35 U.S.C. 154(b) by 187 days.

(21) Appl. No.: 12/583,412

(22) Filed: Aug. 20, 2009

(65) Prior Publication Data
US 2009/0314719 A1 Dec. 24, 2009

Related U.S. Application Data

(63) Continuation of application No. 10/917,152, filed on Aug. 12, 2004, now Pat. No. 7,641,971.

(60) Provisional application No. 60/494,958, filed on Aug. 13, 2003.

(51) Int. Cl.
B05D 7/00 (2006.01)
C02F 1/70 (2006.01)
B09C 1/00 (2006.01)
B82Y 30/00 (2011.01)
B09C 1/08 (2006.01)
C02F 103/06 (2006.01)
C02F 101/36 (2006.01)
C02F 1/36 (2006.01)
C02F 101/20 (2006.01)
C02F 101/32 (2006.01)
C02F 101/22 (2006.01)

(52) U.S. Cl.
CPC ............. C02F 1/705 (2013.01); C02F 2103/06 (2013.01); C02F 2101/363 (2013.01); C02F 1/36 (2013.01); C02F 2101/20 (2013.01); C02F 2101/32 (2013.01); C02F 2101/36 (2013.01); B09C 1/002 (2013.01); C02F 2101/22 (2013.01); B82Y 30/00 (2013.01); B09C 1/08 (2013.01); C02F 2305/08 (2013.01)
USPC .......................................... 427/215; 427/217

(58) Field of Classification Search
USPC ................................................ 427/212–220
See application file for complete search history.

(56) References Cited

U.S. PATENT DOCUMENTS

| 3,953,575 | A | | 4/1976 | Gidaspow et al. | |
|---|---|---|---|---|---|
| 4,130,506 | A | * | 12/1978 | Collier et al. | 252/1 |
| 4,450,188 | A | * | 5/1984 | Kawasumi | 427/217 |
| 4,857,417 | A | | 8/1989 | Kitaoka et al. | |
| 4,944,985 | A | * | 7/1990 | Alexander et al. | 428/570 |
| 5,085,944 | A | | 2/1992 | Ebato et al. | |
| 5,202,030 | A | | 4/1993 | Axnas | |
| 5,512,094 | A | * | 4/1996 | Linton | 106/409 |
| 5,512,379 | A | | 4/1996 | Kawasumi et al. | |
| 5,611,936 | A | | 3/1997 | Fernando et al. | |
| 5,614,320 | A | * | 3/1997 | Beane et al. | 428/403 |
| 5,750,036 | A | | 5/1998 | Sivavec | |
| 5,759,389 | A | | 6/1998 | Fernando et al. | |
| 5,763,085 | A | | 6/1998 | Atarashi et al. | |
| 5,798,439 | A | | 8/1998 | Lefebvre et al. | |
| 5,876,606 | A | | 3/1999 | Blowes et al. | |
| 5,882,802 | A | | 3/1999 | Ostolski | |
| 5,911,882 | A | | 6/1999 | Benjamin et al. | |
| 5,914,436 | A | | 6/1999 | Klabunde et al. | |
| 5,990,373 | A | | 11/1999 | Klabunde | |
| 6,001,258 | A | | 12/1999 | Sluys et al. | |
| 6,045,925 | A | | 4/2000 | Klabunde et al. | |
| 6,214,560 | B1 | | 4/2001 | Yguerabide et al. | |
| 6,287,472 | B1 | | 9/2001 | Gillham et al. | |
| 6,517,939 | B1 | * | 2/2003 | Moini et al. | 428/402 |
| 6,586,193 | B2 | | 7/2003 | Yguerabide et al. | |
| 6,714,299 | B2 | | 3/2004 | Peterson et al. | |
| 6,716,525 | B1 | | 4/2004 | Yadav et al. | |
| 7,641,971 | B2 | * | 1/2010 | Papagianakis | 428/403 |
| 7,674,526 | B2 | * | 3/2010 | Feitz et al. | 428/403 |
| 2002/0061363 | A1 | * | 5/2002 | Halas et al. | 427/217 |
| 2002/0151602 | A1 | | 10/2002 | Vance et al. | |
| 2003/0039857 | A1 | * | 2/2003 | Zhang et al. | 428/655 |
| 2003/0207328 | A1 | | 11/2003 | Yguerabide et al. | |
| 2004/0055419 | A1 | * | 3/2004 | Kurihara et al. | 75/362 |
| 2005/0202244 | A1 | * | 9/2005 | Papagianakis | 428/403 |
| 2006/0177660 | A1 | | 8/2006 | Kumar et al. | |
| 2007/0290175 | A1 | | 12/2007 | Kim | |

FOREIGN PATENT DOCUMENTS

JP 2-066101 3/1990

OTHER PUBLICATIONS

Glavee et al, Chemistry of Borohydride Reduction of Iron(II) and IRon(III) Ions in Aqueous and Nonaqueous Media, Inorg. Chem. 1995, 34, 28-35.*
P. Wipf, Chem 1140; Techniques for Handling Air-Sensitive Compounds, which is an excerpt from the book The Manipulation of Air-Sensitive Compounds ($2^{nd}$ Ed.) by Shriver and Drezdzon, Wiley-Interscience, NY, 1986.*
Zhang et al., Treatment of chlorinated organic contaminants with nanoscale bimetallic particles, Catalysis Today 40 (1998) 387-395.*
Glavee et al., "Chemistry of Borohydride Reduction of Iron (II) and Iron (III) Ions in Aqueous and Nonaqueous Media. Formation of Nonoscale Fe, FeB, and Fe2B Powders," Inorg. Chem. 34(1):28-35 (1995).
Lien et al., "Complete Reduction of Chlorinated Ethylenes by Nanoscale Bimetallic Particles," Div. of Environmental Chem. Preprints of Extended Abstracts 38(1):29-30 (1998) from Symposia Papers Presented before the Division of Environmental Chemistry American Chemical Society, Dallas, TX, Mar. 29-Apr. 2, 1998.

(Continued)

Primary Examiner — Holly Le

(57) ABSTRACT

The invention relates to metal-treated particles, methods for their preparation and methods for using metal-treated particles for, e.g., remediation of process waste-water, sewage, contaminated groundwater aquifers, and soil containing harmful contaminants. Another aspect of the invention relates to a metal-treated particle comprising a ferrosoferric oxide core and a metal supported on the core, where the average diameter or other largest transverse dimension of the core is from about 75 nm to about 990 nm and the amount of metal supported on the core is from about 8% to about 22% by weight, based on the weight of the metal-treated particle.

21 Claims, No Drawings

(56) References Cited

OTHER PUBLICATIONS

Schafer et al., "Numerical modeling of the simultaneous degradation of TCE and cis-DCE by zero-valent iron," Intl. Assn. of Hydrological Sciences, No. (275):441-446 (2002).

Vance, "Treatment of Chlorinated Hydrocarbon Contaminated Groundwater with the Injection of Nanoscale Reactive Particles," 2002 at http://2the4.net/collidinj.htm.

Wang et al., "Synthesizing Nanoscale Iron Particles for Rapid and Complete Dechlorination of TCE and PCBs," Environmental Science and Technology 31(7):2154-6 (1997).

Zhang et al., "Rapid and Complete Dechlorination of TCE and PCBs by Nanoscale Fe and Pd/Fe Particles," Div. of Environmental Chemistry Reprints of Extended Abstracts 37(1):78-79 (1997).

Zhang et al., "Treatment of chlorinated organic contaminants with nanoscale bimetallic particles," Catalysis Today 40(4):387-95 (1998).

Schafer et al., "Competing TCE and cis-DCE degradation kinetics by zero-valent iron-experimental results and numerical simulation," J. Contaminant Hydrology 65:183-2002 (2003).

Ponder et al., "Remediation of Cr(VI) and Pb(II) Aqueous Solutions Using Supported, Nanoscale Zero-valent Iron," Environ. Sci. Technol. 34:2564-2569 (2000).

* cited by examiner

METHOD OF MAKING METAL-TREATED PARTICLES OF SPECIFIC SURFACE AREA FOR REMEDIATION

This application is a continuation of prior U.S. patent application Ser. No. 10/917,152 filed on Aug. 12, 2004 now U.S. Pat. No. 7,641,971.

This application claims the benefit of U.S. provisional application No. 60/494,958, filed Aug. 13, 2003, the disclosure of the provisional application being incorporated by reference herein in its entirety.

FIELD OF THE INVENTION

The present invention relates to metal-treated particles, methods for their preparation and methods for using metal-treated particles for, e.g., remediation of process waste-water, sewage, contaminated groundwater aquifers, and soil containing harmful contaminants.

BACKGROUND OF THE INVENTION

Contamination of groundwater, i.e., underground water, is a major problem affecting, for example, sources of drinking water. Many contaminants are known or potential threats to human health. Some contaminants were once widely used in industrial and commercial activities, and they entered the soil and/or groundwater through improper or illegal disposal practices. Some contaminants are present in sewage and/or process waste-water and must be remediated before they are discharged into the waterway system. At present, billions of dollars are spent each year to remediate process waste-water, sewage, wastes that are radioactive, contaminated groundwater aquifers, and soil containing harmful contaminants. Remediation methods include above-ground methods and in-ground methods.

U.S. Pat. No. 5,611,936 to Fernando et al. (Fernando) discloses an above-ground method in which trichlorethylene can be removed from groundwater by air-stripping followed by absorption of the trichlorethylene-containing air-stream onto activated carbon. Other above-ground methods disclosed by Fernando include the addition of hydrogen peroxide or ozone to an aqueous solution containing the halogenated organic compound followed by high intensity ultraviolet irradiation.

U.S. Pat. No. 5,990,373 to Klabunde discloses nanoscale metal oxides, such as MgO, CaO and $Fe_2O_3$, useful for adsorbing certain toxic chemical compounds from, e.g., a liquid phase. However, U.S. Pat. No. 5,990,373 does not disclose or suggest a metal element, either alone or in combination with a metal oxide, useful for removing contaminants from a liquid phase.

Methods for removing contaminants from an aqueous stream with elemental metals are known. For example, U.S. Patent Application No. 2003/0039857 A1 discloses that water containing chlorinated hydrocarbons (CHs) can be treated by passing the contaminated water though a column of granular iron. The publication discloses that the CHs are transformed into benign compounds such as hydrocarbons, chloride and water. U.S. Patent Application No. 2003/0039857 A1 further discloses that the granulated iron can be for used in-ground remediation. This reference discloses that a porous "wall" of the granulated iron must, disadvantageously, be placed into the path of a contaminated groundwater plume containing a chlorinated hydrocarbon.

Other in-ground methods describe groundwater treatment done by, e.g., injecting a suitable agent into the groundwater through a bore hole. The remediation agent can either transform the target compound into a benign species, as discussed above, or render it insoluble. For example, an elemental metal can be used to remove a metal salt (or metalloid) contaminant from water by reducing the metal salt (or metalloid) with the elemental metal to form an insoluble species.

Fernando discloses that a bimetallic system of iron and 9% palladium can be used to reductively dechlorinate hydrocarbon solvents. However, the relatively high cost of the raw material palladium makes such a system unattractive for in-ground remediation, where the palladium cannot be recovered.

U.S. Patent Application Publication No. 2002/0151602 discloses nanoscale metallic and bimetallic colloid particles, defined by that publication as ranging from 1 to 999 nanometers in size, allegedly useful for dechlorinating hydrocarbon solvents and treating soluble metals and metalloids present in subsurface soil. The publication alleges that the use of colloidal particles increases the reactivity of the particles and allows for adjective colloidal transport. However, the reference does not disclose a supported elemental metal.

U.S. Patent Application Publication No. 2003/0039857 A1 discloses nanoscale metal and bimetallic particles allegedly useful for treating groundwater containing chlorinated contaminants. The nanoscale metal particles are formed by adding an aqueous sodium borohydride solution dropwise to an aqueous ferric chloride solution while stirring. The publication also discloses that the bimetallic particles may be supported on activated carbon, zeolite or silica. However, the reference does not disclose a particle where the reductant elemental metal is supported.

U.S. Pat. No. 6,045,925 to Klabunde et al. discloses a composite particle containing an elemental metallic core and a shell. However, the patent does not disclose a composite particle with elemental metallic shell and a core which is not an elemental metal, nor does it disclose the use of the composite material for removing contaminants from groundwater.

SUMMARY OF THE INVENTION

One aspect of the invention relates to a metal-treated particle comprising a core and a metal supported on the core.

Another aspect of the invention relates to a metal-treated particle where the core comprises an oxide, a silicon dioxide-type particulate, an amorphous siliceous material, or any mixture thereof.

Another aspect of the invention relates to a metal-treated particle comprising a ferrosoferric oxide core and a metal supported on the core, where the average diameter or other largest transverse dimension of the core is from about 75 nm to about 990 nm and the amount of metal supported on the core is from about 8% to about 22% by weight, based on the weight of the metal-treated particle.

Another aspect of the invention relates to a dispersion comprising a plurality of the metal-treated particles of the invention and, optionally, a dispersant.

Another aspect of the invention relates to a method for preparing a metal-treated particle comprising a core and a metal supported on the core, comprising:

(a) providing a core particle, a metal-supplying agent and a reductant, (b) contacting the metal-supply agent and the reductant in the presence of the core particle to form a metal supported on the core particle, and (c) optionally, recovering the metal-treated particle.

Another aspect of the invention relates to a metal-treated particle formed by this method.

Another aspect of the invention relates to a method of remediating a contaminant present in groundwater comprising:

(a) providing a plurality of metal-treated particles of the invention, optionally in the form of a dispersion comprising a dispersant, (b) optionally, providing a device for delivering the metal-treated particles to groundwater comprising the contaminant, and (c) contacting the metal-treated particles and the groundwater, such that the metal-treated particles remediate the contaminant.

Another aspect of the invention relates to a method for remediating a contaminant present in a fluid comprising:

(a) providing a plurality of metal-treated particles of the invention, optionally in the form of a dispersion comprising a dispersant, (b) optionally, providing a device for delivering the metal-treated particles to the fluid containing the contaminant, and (c) contacting the metal-treated particles and the fluid, such that the metal-treated particles remediate the contaminant.

Another aspect of the invention relates to a method for remediating a contaminant present in a fluid comprising:

(a) providing a dispersion of metal-treated particles of the invention, (b) optionally, providing a device for delivering the dispersion to the fluid containing the contaminant, and (c) contacting the dispersion and the fluid, such that the dispersion remediates the contaminant.

Another aspect of the invention relates to a method for remediating a contaminant present in soil comprising:

(a) providing a plurality of metal-treated particles of the invention, optionally in the form of a dispersion comprising a dispersant, (b) optionally, providing a device for delivering the metal-treated particles to soil comprising the contaminant, and (c) contacting the metal-treated particles and the soil, optionally to form a slurry, such that the metal-treated particles remediate the contaminant.

DETAILED DESCRIPTION OF THE INVENTION

The present invention relates to small size particles, e.g., in one embodiment, untreated particles with an average diameter or other largest transverse dimension of from about 5 nm to about 1100 nm, that are treated to form metal-treated particles such that the particles form a core upon which is supported a metal, such as iron. As used herein, the supporting particles are referred to as the "support" or the "core" and the metal supported on the core is referred to as the "supported metal." In another embodiment, the average diameter or other largest transverse dimension of the untreated particles is from about 5 nm to about 990 nm. In another embodiment, the average diameter or other largest transverse dimension of the untreated particles is from about 75 nm to about 990 nm. In another embodiment, the average diameter or other largest transverse dimension of the untreated particles is from about 75 nm to about 500 nm. In another embodiment, the average diameter or other largest transverse dimension of the untreated particles is from about 5 nm to about 300 nm.

As used herein, the "average diameter or other largest transverse dimension" refers to the number average diameter, for spherical or substantially spherical particles, or to the number average largest transverse dimension, for non-spherical particles. When a particle is non-spherical, for example, ellipsoidal or tetrahedral, its largest transverse dimension is equivalent to the greatest distance within the particle from one particle surface to another, e.g., the major axis length for an ellipsoidal particle or the length of the longest side for a tetrahedral particle. The average diameter or other largest transverse dimension, e.g., of the core particles, can be determined by methods well-known to those in the art, e.g., by direct observation through microscopy or indirectly from the ratio of the volume occupied by the particles (e.g., their weight divided by their density) to their surface area; the weight, density and surface area can be determined by methods well-known to those in the art. Technical products, many of which have broad particle size distributions, can be sorted by methods well known to those in the art, e.g., by sieving or centrifugation, to narrow their distribution such that it falls at or within any of the ranges set forth above.

In one embodiment, the support is a oxide, such as ferric trioxide ($Fe_2O_3$), ferrosoferric oxide ($Fe_3O_4$, also knows as magnetite), nickel oxide (NiO), cobalt oxide (CoO), magnesium oxide (MgO), aluminum oxide ($Al_2O_3$; which can be of any phase, such as $\alpha$, $\beta$ or any mixture thereof) and the like; a silicon dioxide-type particulate, such as diatomite and the like; an amorphous siliceous material, such as perlite and the like; or any mixture thereof. In another embodiment, the support is ferric trioxide, ferrosoferric oxide, nickel oxide, cobalt oxide, magnesium oxide, aluminum oxide, diatomite, perlite, or any mixture thereof. In another embodiment, the support is ferric trioxide, ferrosoferric oxide, diatomite, perlite, or any mixture thereof. In another embodiment, the support is ferric trioxide. For example, Example 5 below describes an iron-treated ferric trioxide. In another embodiment, the support is ferrosoferric oxide. For example, Examples 1 and 15 below each describe an iron-treated ferrosoferric oxide. In another embodiment, the support is diatomite. For example, Example 12 below describes an iron-treated diatomite. In another embodiment, the support is perlite. For example, Example 14 below describes an iron-treated perlite. Ferrous oxides and ferric oxides are available commercially from, e.g., Spectrum Chemicals (Gardena, Calif.) and BASF Corp. (Wyandotte, Mich.). Diatomite and perlite are available commercially from, e.g., General Filtration Company (Concord, Ontario, Canada).

In one embodiment, the supported metal on the support is at least one transition metal. When a plurality of metals, i.e., two or more different metals, is supported, the thus-treated metal-treated particles are also referred to as polymetallic-treated particles. As used herein, the term "transition metal" includes each element with an atomic number of from 21 to 30, from 39 to 48 and from 57 to 80, which includes the so-called later transition metals, i.e., the noble metals. In another embodiment, the supported metal on the support is iron, copper, nickel, cobalt, silver, gold, palladium, platinum, or any mixture thereof. In another embodiment, the supported metal on the support is iron, copper, nickel, palladium, platinum, or any mixture thereof. In another embodiment, the supported metal on the support is iron. In another embodiment, the supported metal on the support is copper, In another embodiment, the supported metal on the support is nickel. In another embodiment, the supported metal on the support is cobalt. In another embodiment, the supported metal on the support is iron and nickel. In another embodiment, the supported metal on the support is iron and palladium. In another embodiment, the supported metal on the support is nickel and palladium. In another embodiment, the supported metal on the support is iron, nickel and palladium.

In one embodiment, the total amount of supported metal on the support, which includes all of the metals if a plurality of metals is supported, is from about 1% to about 90% by weight, based on the total weight of the metal-treated particles. In another embodiment, the total amount of supported metal on the support is from about 1% to about 60% by weight, based on the total weight of the metal-treated particles. In another embodiment, the total amount of supported metal on the support is from about 1% to about 45% by weight, based on the total weight of the metal-treated particles. In another embodiment, the total amount of supported metal on the support is from about 5% to about 25% by weight, based on the total weight of the metal-treated particles. In another embodiment, the amount of supported metal on the support is from about 8% to about 22% by weight, based on the total weight of the metal-treated particles. The amount of supported metal on the support can be determined, e.g., gravimetrically from the difference in weight between the treated support and the untreated support or stoichiometrically. For example, for the deposition of iron onto a core from a solution containing ferric chloride and sodium borohydride, stoichiometry provides that a solution comprising 2.9 g of ferric chloride and 3.25 g sodium borohydride provides about 1 g of iron supported on the core.

In one embodiment, the metal-treated particles have an average diameter or other largest transverse dimension of from less than about 10 nm to about 1100 nm. In another embodiment, the average diameter or other largest transverse dimension of the metal-treated particles is from less than about 100 nm to about 1100 mm. In another embodiment, the average diameter or other largest transverse dimension of the metal-treated particles is from less than about 10 nm to about 990 nm. In another embodiment, the average diameter or other largest transverse dimension of the metal-treated particles is from less than about 100 nm to about 990 nm. In another embodiment, the average diameter or other largest transverse dimension of the metal-treated particles is from less than about 100 nm to about 500 nm. In another embodiment, the average diameter or other largest transverse dimension of the metal-treated particles is from about 100 nm to about 200 nm. In another embodiment, the average diameter or other largest transverse dimension of the metal-treated particles is from less than about 10 nm to about 50 nm.

In one embodiment, the metal-treated particles have a Brunauer-Emmett-Teller model surface area (BET, using nitrogen as the adsorptive) of from about 10 $m^2/g$ to about 65 $m^2/g$. In another embodiment, the metal-treated particles have a surface area (BET) of from about 15 $m^2/g$ to about 60 $m^2/g$. In another embodiment, the metal-treated particles have a surface area (BET) of from about 35 $m^2/g$ to about 60 $m^2/g$. In another embodiment, the metal-treated particles have a surface area (BET) of from about 58 $m^2/g$ to about 59 $m^2/g$. In another embodiment, the metal-treated particles have a surface area (BET) of from about 52.5 $m^2/g$ to about 53.5 $m^2/g$. In another embodiment, the metal-treated particles have a surface area (BET) of from about 37 $m^2/g$ to about 38 $m^2/g$.

As an assay of the metal-treated particles' reductive activity, $Fe_3O_4$ particles treated such that iron is the supported material were contacted with an electroless solution of nickel; electroless nickel deposition began shortly thereafter. In contrast, no activity was noted when untreated $Fe_3O_4$ particles were contacted with the electroless solution of nickel.

Without wishing to be bound by theory, the metal-treated particles of the invention are thought to provide a large surface area at a much lower cost than the precipitated, homogeneous nano-iron particles described in the art, e.g., in U.S. Patent Application Publication No. 2003/0039857 A1.

Another embodiment of the present invention relates to methods for the preparation of metal-treated particles. Without wishing to be bound by theory, it is thought that the methods provide a reductive condition existing in proximity to the surface of the support and, therefore, that the support can be metalized by adhering or superficially adhering metal to that surface.

In one embodiment, at least one reagent known as a "metal-supplying agent," such as ferric chloride to provide iron, is used for treating a support, e.g., any of the supports disclosed above, to provide a metal-treated support. Non-limiting examples of metal-supplying agents include transition metal halides, which, as used herein, includes mixed halides (e.g., CuICl), transition metal sulfates, transition metal acetates or any mixture thereof. Non-limiting examples of transition metal halides include transition metal chlorides, e.g., ferric chloride, ferrous chloride, cupric chloride, cobaltous chloride, nickelous chloride, hydrates thereof, and the like; transition metal bromides, e.g., ferric bromide, ferrous bromide, cupric bromide, cobaltous bromide, nickelous bromide, hydrates thereof, and the like; and transition metal iodides, e.g., ferric iodide, ferrous iodide, cupric iodide, cobaltous iodide, nickelous iodide, hydrates thereof, and the like. Non-limiting examples of transition metal sulfates include, e.g., ferric sulfate, ferrous sulfate, cupric sulfate, cobaltous sulfate, nickelous sulfate, hydrates thereof, and the like. Non-limiting examples of transition metal acetates include, e.g., ferric acetate, ferrous acetate, cupric acetate, cobaltous acetate, nickelous acetate, hydrates thereof, and the like. When it is desired that a plurality of metals be supported, a plurality of metal-supplying agents can be used. For example, Example 17 below describes the use of nickel acetate, ferric chloride and palladium chloride as metal-supplying agents.

In another embodiment, the treatment is conducted in a fluid medium. In another embodiment, the fluid medium is a liquid. In another embodiment, the liquid is able to dissolve the metal-supplying agent. In another embodiment, the liquid contains water. In another embodiment, the liquid consists essentially of water. In another embodiment, the liquid is water. In another embodiment, the water is distilled water. In another embodiment, the water is deionized water.

In another embodiment, a metal-supplying agent is provided in the form of a solid. In another embodiment, the metal-supplying agent is provided in the form of a finely-divided solid, e.g., having a mesh size of from about 580 mesh (about 18 μm) to about 150 mesh (about 105 μm). The finely-divided solid agent can be obtained by any conventional method, such as by passing the agent through a standard sieve, filtration, air current separation, flotation, and the like.

In another embodiment, a metal-supplying agent is provided in the form of a solution. In another embodiment, the solvent for the metal-supplying agent solution contains water. In another embodiment, the metal-supplying agent is provided in the form of an aqueous solution. The concentration of the metal-supplying agent solution can vary over a wide range. In one embodiment, the concentration of the metal-supplying agent solution is from about 0.04 M to about 9 M and/or the solubility limit of the metal-supplying agent, whichever is greater. In another embodiment, the concentration of the metal-supplying agent solution is from about 0.04 M to about 3 M.

In one embodiment, treatment of the support begins by admixing the metal-supplying agent and the support in the fluid medium. These ingredients can be provided in any order. A means for mixing the fluid medium, the metal-supplying agent and the support can be provided in one embodiment. The means for mixing can be any appropriate conventional mixing means known in the art, e.g. a propeller mixer. As those skilled in the art will recognize, the use of magnetic stirring apparatus may not be appropriate when an ingredient used is magnetic or magnetizable, such as a support containing iron and/or when an iron-supplying agent is used.

The mixture comprising the support and the metal-supplying agent is then contacted with a reductant, e.g., sodium borohydride. As used herein, the term "reductant" means one or more materials that react with the metal-supplying agent to provide, supported on the core, a reduced form of the metal component of the metal-supply agent. For example, without wishing to be bound by theory, it is thought that elemental iron, i.e., Fe(0), is formed when a metal-supplying agent containing iron, such as ferric chloride, is reacted with a reductant such as sodium borohydride.

The reductant may be in the form of a solid, liquid or gas. Examples of reductants include but are not limited to alkali metal hydrides, such as sodium borohydride, potassium borohydride, lithium borohydride, lithium aluminum hydride, potassium aluminum hydride and sodium aluminum hydride; alkali metal azides, such as sodium azide and potassium azide; a hydrazine, such as hydrazine or hydrazine hydrate; hydrogen gas; and organometallic compounds, e.g, lithium alkyls, such as methyllithium and butyllithium; magnesium alkyls, such as dibutyl magnesium; and aluminum alkyls, such as triethylaluminum.

In another embodiment, the reductant is an alkali metal hydride, an alkali metal azide, a hydrazine, or any mixture thereof. In another embodiment, the reductant is sodium borohydride, potassium borohydride, lithium borohydride, sodium azide, potassium azide, hydrazine, hydrazine hydrate, or any mixture thereof. In another embodiment, the reductant is an alkali metal hydride. In another embodiment, the reductant is sodium borohydride, potassium borohydride, lithium borohydride, or any mixture thereof.

In one embodiment, a reductant is provided in the form of a solid. In another embodiment, the reductant is provided in the form of a finely-divided solid, e.g., having a mesh size of from about 580 mesh to about 150 mesh. The finely-divided solid reductant can be obtained by any conventional method, such as by passing the reductant through a standard sieve, filtration, air current separation, flotation, and the like.

In another embodiment, a reductant is provided in the form of a solution. In another embodiment, the solvent for the reductant solution contains water. In another embodiment, the reductant is provided in the form of an aqueous solution. The concentration of the reductant solution can vary over a wide range. In one embodiment, the concentration of the reductant solution is from about 0.04 M to about 5 M and/or the solubility limit of the reductant, whichever is greater. In another embodiment, the concentration of the reductant solution is from about 0.04 M to about 4 M.

Treatment of the support continues by admixing the reductant and the fluid medium, which already contains the metal-supplying agent and the support as discussed above. If hydrogen gas is generated upon admixing, prudent safety precautions known to those in the art suggest that the reductant be added in sufficiently small quantities such that the hydrogen gas generated can be safely dissipated. Moreover, if vigorous reaction occurs upon admixing, prudent safety precautions known to those in the art suggest that the reductant be added in sufficiently small quantities such that the reaction can be safely controlled. For example, in Example 1, small aliquots of an aqueous sodium borohydride solution were carefully added to the fluid over a 1-2 hour period and, in Example 15, an aqueous sodium borohydride solution was slowly fed to the fluid over a period of about 2.5 hours.

If the reductant is water-reactive, e.g., a metal hydride or metal alkyl, the process of treating the metal-supplying agent and support is done under anhydrous conditions. If the process comprises a liquid diluent or solvent and a water-reactive reductant, the solvent must be aprotic and dry, in one embodiment containing less than 10 ppm of water by weight and in another embodiment containing less than 5 ppm of water by weight. Non-limiting examples of aprotic solvents that can be used with a water-reactive reductant include aliphatic hydrocarbons such as heptane, aromatic hydrocarbons such as toluene, and ethers such as diethylether and tetrahydrofuran. Methods of performing reactions with water-reactive materials are well-known to the art; exemplary methods are disclosed in, e.g., D. F. Shriver and M. M. Drezden, *The Manipulation of Air-Sensitive Compounds* ($2^{nd}$ ed. 1986). Once the process is complete, any unreacted reductant can be neutralized by the careful addition of a neutralizing agent, such as alcohol, followed by water washing to remove by-products.

In another embodiment, the fluid is mixed by any appropriate conventional mixing means, such as discussed previously, while admixing the reductant and the fluid. In another embodiment, mixing of the fluid continues after the addition of reductant is complete. For example, mixing can continue for about an additional 10-15 minutes and/or until completion, e.g., when the reading of an electrical pH meter in contact with the fluid attains a reading of above about pH 8.5-9, as described in Examples 1 and 15.

Metal-treated particles can be formed at any convenient temperature. Satisfactory results have been obtained at temperatures of from about 15° C. to about 30° C.; however, other temperatures can be used.

If desired, the metal-treated particles can be recovered by methods known to those in the art, e.g., by conventional filtration, vacuum filtration, with a filter press, or by centrifugation. In another embodiment, the metal-treated particles are used as made, e.g., as an aqueous dispersion when they are made in an aqueous fluid medium. In another embodiment, the metal-treated particles can be washed with, e.g., water, distilled water and/or deionized water.

It has been observed that metal-treated particles retain, over an extended period of time, their activity, e.g., for reducing the level of a contaminant in a solution. For example, a batch of iron-treated ferrosoferric oxide particles retained their ability for reducing the level of contaminant in a solution over a period for at least three months after the particles were treated.

The above-described processes can be easily scaled up, safely and economically, to provide, e.g., from about 23 to about 136 kg/day (from about 50 to about 300 lbs/day) of metal-treated particles. For example, Example 15 below describes the preparation of kilogram quantities of ferrous/ferric oxides treated with iron.

In another embodiment, the present invention relates to the metal-treated particle product of any of the methods herein for making it.

In another embodiment, optionally a metal and/or noble metal, such as silver, gold, palladium, platinum or any mixture thereof, can be deposited in a separate step on the metal-treated particles by methods known to those in the art, e.g., by immersion or electroless deposition. For example, U.S. Patent Application No. 2003/0039857 A1 discloses such particles, termed "bimetallic particles" therein, and methods for making them. Without wishing to be bound by theory, it is thought that doing so can, e.g., enhance the dehalogenating properties of such metal-deposited or noble metal-deposited metal-treated particles.

In another embodiment, optionally a dispersant can be used with the metal-treated particles, e.g., to aid in forming a dispersion, to enhance the amount of time that dispersed particles remain dispersed and/or to inhibit agglomeration. For example, Examples 9 and 10 below describe using a dispersant with iron-treated ferrosoferric oxide particles. In one embodiment, the dispersant does no substantial harm to the environment into which it is introduced. In another embodiment, the dispersant is beneficial to underground microorganisms.

In one embodiment, the dispersant is xanthate, silicide, starch, glycerol, agar, albumen, hemoglobin, dextran, propionic acid, oleic acid esters, oleic acid salts, carboxymethylcellulose, JELLO and sodium laurel sulfate, acacia, gelatine, poly(N-vinyl-2-pyrrolidone), saponified olive oil, methyl cellulose, or any mixture thereof. In another embodiment, the dispersant is JELLO and sodium laurel sulfate, acacia, gelatine, poly(N-vinyl-2-pyrrolidone), saponified olive oil, methyl cellulose, or any mixture thereof. In another embodiment, the dispersant is methyl cellulose. In another embodiment, the dispersant is food-grade methyl cellulose.

In one embodiment, the amount of dispersant used is from about 0.02 g to about 2.0 g per gram of metal-treated particles. In another embodiment, the amount of dispersant used is from about 0.03 g to about 1.6 g per gram of metal-treated particles. In another embodiment, the amount of dispersant used is from about 0.04 g to about 1.0 g per gram of metal-treated particles.

A dispersant can be used with metal-treated particles by placing them in contact with an aqueous solution of the dispersant. The metal-treated particles and the dispersant solution can be admixed by a means known to the art, e.g., for from about 5 minutes to about 24 hours in a HAMILTON-BEACH blender modified to comprise a propeller-type mixer operating at from about 625 rpm to about 1,725 rpm.

In another embodiment, the present invention relates to the metal-treated particle/dispersant admixture product of any of the methods herein for making it.

The deposition of metal, such as iron, by the above method on supports that are harmless to the environment can impart dehalogenating and catalytic properties, and make the metal-treated particles useful in many ways.

Another embodiment involves methods for "remediating," i.e., reducing the amount of, a contaminant with metal-treated particles of the invention, e.g., with POLYMETALLIX™ nanoiron particles, available commercially from Polyflon Company (Norwalk, Conn.). Remediation can be conducted at any convenient temperature. Satisfactory results have been obtained at temperatures of from about 15° C. to about 30° C.; however, other temperatures can be used. For example, in one embodiment, remediation of groundwater with metal-treated particles of the invention can be conducted at a temperature of from about 1° C. to about 50° C. In another embodiment, remediation of groundwater with metal-treated particles of the invention can be conducted at a temperature of from about 1° C. to about 40° C.

Non-limiting examples of organic contaminants, e.g., that can be remediated by contact with the metal-treated particles of the invention, include, e.g., hydrocarbons also containing at least one heteroatom, such as chlorine, fluorine, iodine, bromine, sulfur, nitrogen, phosphorous or any mixture thereof and, particularly, halogenated hydrocarbons. Non-limiting examples of halogenated hydrocarbons include chlorinated hydrocarbons (CHs) containing one to three carbon atoms, e.g., tetrachloroethylene (PERC or PCE), 1,1,2,2-tetrachloroethane (TCE), trichloroethylenes (TCEs, such as 1,2,2-trichlorethylene and 1,1,2-trichloroethylene), dichloroethylenes (DCEs, such as cis-1,2-dichloroethylene (cis-DCE) and trans-1,2-dichloroethylene (trans-DCE)), vinyl chloride (VC), carbon tetrachloride (CT) and chloroform; halogenated aromatics, e.g., hexachlorobenzene and polychlorinated biphenyls (PCBs); halogenated herbicides, e.g., mecoprop, metolachlor and trifluralin; and halogenated pesticides, e.g., chlordane, lindane and methoxychlor.

Non-limiting examples of inorganic contaminants include perchlorates, i.e., materials comprising the perchlorate ($ClO_4^-$) anion such as perchloric acid, its esters, its salts (e.g., the sodium salt of perchloric acid, the potassium salt of perchloric acid) and the like; metals and/or their salts, such as transition metals, e.g., chromium (e.g., hexavalent chromium), copper, scandium, titanium, vanadium, manganese, cobalt, nickel, zinc, mercury and the like; metalloids of, e.g., arsenic, technetium, selenium and the like; lanthanides, e.g., lanthanum, cerium and the like; and actinides, e.g., uranium, thorium, plutonium and the like.

For example, iron-treated $Fe_3O_4$ particles of the invention have been shown to be effective in removing a major portion of TCEs from water contaminated with from about 10 mg/L to about 15 mg/L of TCEs. Moreover, since the metal-treated particles of the invention, e.g., POLYMETALLIX™ nanoiron particles, are effective in remediating halogenated hydrocarbons containing chlorine, they are thought to be effective in remediating halogenated hydrocarbons containing other halogens, i.e., fluorine, bromine or iodine, and in remediating halogenated hydrocarbons containing any mixture of halogens, i.e., any combination of two or more of fluorine, chlorine, bromine and iodine.

In another embodiment, the metal-treated particles of the invention, e.g., POLYMETALLIX™ nanoiron particles, are useful for remediating contaminants in groundwater.

In another embodiment, the invention relates to a method for remediating a contaminant present in groundwater, e.g., dechlorinating a chlorinated hydrocarbon and/or precipitating an inorganic salt or metalloid, comprising:

(a) providing a dispersion of metal-treated particles of the invention, (b) optionally, providing a device for delivering the dispersion to groundwater containing the contaminant, and (c) contacting the dispersion and the groundwater, such that the dispersion remediates the contaminant.

Examples of underground groundwater treatment devices useful in the present invention include bags, gates, tubes, perforated or non-perforated panels or walls and the like, such as those disclosed by Fernando, which is incorporated by reference in its entirety.

Devices useful for contacting the dispersion and the groundwater include those devices that deliver the metal-treated particles of the invention, or dispersions containing them, to soil and include those well-known in the art. In one embodiment, a bore hole is made in the ground, preferably extending below the water table. A pipe is placed into the bore hole. The pipe is connected to a pump, and the dispersion containing metal-treated particles is pumped into the soil. In one embodiment, the end of the pipe in the bore hole is perforated or equipped with a porous element, thereby promoting delivery of the dispersion into the soil, such as is described in U.S. Patent Application Publication No. 2002/0151602 A1, which is incorporated by reference in its entirety. The injection pressure, rate of injection and concentration of metal-treated particles in the dispersion are determined by experimentation routine to those in the art and will depend, in part, on the targeted contaminant as well as local soil and hydraulic conditions.

The effectiveness of the soil and/or groundwater decontamination procedure can be determined, e.g., by measuring the concentration of the targeted contaminant in groundwater at various locations around the bore hole.

In another embodiment, the metal-treated particles of the invention, e.g., POLYMETALLIX™ nanoiron particles, are useful for remediating contaminants in a liquid or fluid, such as process waste-water and/or sewage.

In another embodiment, the invention relates to a method for remediating a contaminant present in a fluid, e.g., decreasing the concentration of a metal therein, comprising:
 (a) providing metal-treated particles of the invention,
 (b) optionally, providing a device for delivering the metal-treated particles to the fluid containing the contaminant, and
 (c) contacting the metal-treated particles and the fluid,
such that the metal-treated particles remediate the contaminant.

Contacting the metal-treated particles and the fluid can be effected by, e.g., admixing the fluid and the metal-treated particles, adding the metal-treated particles to the fluid, and/or adding the fluid to the metal-treated particles. The contact can be assisted by conventional apparatus known to the art, such as mechanical mixing with mixing devices known to the art, by ultrasonication, by mixing baffles, and the like.

In another embodiment, the invention relates to a method for remediating a contaminant present in a fluid, e.g., decreasing the concentration of a metal therein, comprising:
 (a) providing a dispersion of metal-treated particles of the invention,
 (b) optionally, providing a device for delivering the dispersion to the fluid containing the contaminant, and
 (c) contacting the dispersion and the fluid,
such that the dispersion remediates the contaminant. For example, Examples 2, 6, 10, 11, 13 and 16 below each describe remediating a chromium-contaminated liquid and Example 8 describes remediating a copper-contaminated liquid.

Contacting the dispersion and the fluid can be effected by, e.g., admixing the fluid and the dispersion, adding the dispersion to the fluid, adding the fluid to the dispersion, and/or impinging separate streams of dispersion and fluid. The contact can be assisted by mechanical mixing with mixing devices known to the art, by ultrasonication, by mixing baffles, and the like.

The effectiveness of the fluid remediation procedure can be determined, e.g., by measuring the concentration of the targeted contaminant in the fluid before and after the dispersion is contacted with the fluid.

In another embodiment, the invention relates to a method for remediating a contaminant present in soil, e.g., decreasing the concentration of a metal therein, comprising:
 (a) providing metal-treated particles of the invention, optionally in the form of a dispersion,
 (b) optionally, providing a device for delivering the metal-treated particles to soil containing the contaminant, and
 (c) contacting the metal-treated particles and the soil, optionally to form a slurry,
such that the metal-treated particles remediate the contaminant.

Contacting the metal-treated particles and/or a dispersion thereof and the soil can be effected by, e.g., admixing the soil and the metal-treated particles and/or dispersion, adding the metal-treated particles and/or dispersion to the soil, or adding the soil to the metal-treated particles and/or dispersion. The contact can be assisted by providing a fluid, such as water, in a sufficient quantity to form a slurry from the soil and the metal-treated particles and/or dispersion thereof and, optionally, kneading the slurry.

The effectiveness of the soil remediation process can be determined, e.g., by measuring the concentration of the targeted contaminant in the soil before and after the metal-treated particles are contacted with the soil.

In another embodiment, the dispersion is provided in the form of a concentrated dispersion or concentrate, the concentrate is diluted, e.g., with water, to form a working-strength dispersion, and the working-strength dispersion is contacted with a contaminated fluid such that the working-strength dispersion remediates the contaminant. For example, Example 9 below describes the preparation of a concentrated dispersion, and Example 11 describes preparing a working-strength dispersion from the concentrate and remediating a contaminant using the working-strength dispersion.

In another embodiment, contaminants that can be remediated by these methods include inorganic contaminants, organic contaminants and combinations thereof. In one embodiment, the contaminant is at least one inorganic contaminant, at least one organic contaminant, or any combination thereof, e.g., one inorganic contaminant and one organic contaminant, one inorganic contaminant and three organic contaminants, two inorganic contaminants and two organic contaminants, five inorganic contaminants, two organic contaminants, etc.

In one embodiment, the contaminant is at least one perchlorate, at least one perchlorate salt, at least one perchlorate ester, at least one metal, at least one metal salt, at least one metalloid, or any combination thereof. In another embodiment, the contaminant is at least one metal, at least one metal salt, at least one metalloid, or any combination thereof. In another embodiment, the contaminant is chromium, copper, scandium, titanium, vanadium, manganese, cobalt, nickel, zinc, mercury, an arsenic metalloid, a technetium metalloid, a selenium metalloid, lanthanum, cerium, uranium, thorium, plutonium, a salt thereof, or any combination thereof. In another embodiment, the contaminant is chromium, copper, scandium, titanium, vanadium, manganese, cobalt, nickel, zinc, mercury, an arsenic metalloid, uranium, thorium, plutonium, a salt thereof, or any combination thereof.

In one embodiment, the contaminant is at least one hydrocarbon containing at least one heteroatom, at least one halogenated hydrocarbon, or any combination thereof. In another embodiment, the halogenated hydrocarbon contains from one to three carbon atoms. In another embodiment, the contaminant is tetrachloroethylene, 1,1,2,2-tetrachloroethane, a trichloroethylene, a dichloroethylene, vinyl chloride, carbon tetrachloride, chloroform, a polychlorinated biphenyl, a halogenated herbicide, a halogenated pesticide, or any mixture thereof. In another embodiment, the contaminant is tetrachloroethylene, 1,1,2,2-tetrachloroethane, a TCE, VC, CT, chloroform, a PCB, or any mixture thereof.

Among their many uses, ferric trioxide and/or ferrosoferric oxide are presently used in applications such as magnetic ink coatings and recording media. Treating these substrates according to a process of the invention to form metal-treated ferric trioxide and/or ferrosoferric oxide particles may enhance their properties compared to the corresponding untreated particles, thereby enhancing the applications in which the corresponding untreated particles are presently used. Additionally, ferrosoferric oxide is used to remediate nuclear wastes. As one product of the invention is iron-treated ferrosoferric oxide particles, such metal-treated particles of the invention could provide a more effective nuclear waste remediation agent.

EXAMPLES

As noted above, the metal-treated particles of the invention impart advantageous performance, such as in the removal of contaminants from, e.g., process waste-water, sewage, radioactive wastes, soil and groundwater.

The following examples further illustrate certain embodiments of the present invention. These examples are provided solely for illustrative purposes and in no way limit the scope of the present invention.

Example 1

Preparation of Ferrosoferric Oxide Treated with Iron

This example provides, e.g., iron-treated ferrosoferric oxide particles and a method for making the same by treating ferrosoferric oxide particles with iron.

The following approximate amounts of materials were used:

800 mL water,
18 mL of 1 M $FeCl_3$ (containing 2.9 g anhydrous $FeCl_3$; obtained from Spectrum Chemicals),
9 g of ferrosoferric oxide black particles ($Fe_3O_4$; obtained from Spectrum Chemicals), and
86 mL of 1 M $NaBH_4$ (containing 3.25 g $NaBH_4$; obtained in powder form from Spectrum Chemicals).

Based on information from the supplier, the ferrosoferric oxide black, before treatment, is believed to have the following properties: 0.1 µm average particle diameter; isometric particle shape; about 15.3 $m^2/g$ specific surface area (BET); and 5.2 g/cc approximate density.

The water was added to a 1 L beaker equipped with a propeller mixer. The temperature was about 25° C. throughout this example. To begin the treatment, the $FeCl_3$ solution was added to the water while stirring at about 1,400 rpm. The ferrosoferric oxide black particles were added to form a suspension. The $NaBH_4$ solution was carefully added in small aliquots over a 1-2 hour period to the stirred suspension. During addition of the $NaBH_4$ solution, a chemical reduction process took place, releasing hydrogen gas and depositing iron on the surface of the ferrosoferric oxide black particles to produce iron-treated ferrosoferric oxide black particles. After the entire quantity of NaBH was added, stirring was continued for about an additional 10-15 minutes until completion of the reaction, i.e., when the reading of an electrical pH meter in contact with the stirred suspension attained a reading in the range of from about pH 8.5 to about pH 10. The stirring was stopped, the metal-treated particles were recovered by vacuum filtration, and the recovered particles were washed three times with water.

About 10 g of iron-treated ferrosoferric oxide black particles were produced. Without wishing to be bound by theory, it is thought that iron deposition occurred on the $Fe_3O_4$ particles.

As determined from stoichiometry, the product particles contained about 90 wt. % $Fe_3O_4$ and about 10 wt. % supported iron and had activity for, e.g., removing chromium from a $CrO_3$ solution, as described in the following example.

Example 2

Contacting a Chromium-Containing Solution with the Example 1 Particles

At about 25° C., about 40 mL of the dispersion of Example 1, containing about 1 g of particles, was contacted with about 20 mL of aqueous $CrO_3$ contaminant solution 1, containing about 725 mg Cr/L water.

Before being contacted with the metal-treated particles of Example 1, the $CrO_3$ contaminant solution 1 appeared yellow in color. After being in contact with the metal-treated particles of Example 1 for less than 15 minutes, the contaminant solution appeared clear in color, indicating by the color change that the majority of chromium had been removed from contaminant solution 1 by the metal-treated particles. Pursuant to Example 10 below, it was determined that a similar clear-colored solution, previously containing chromium, had a chromium level lower than 0.05 mg Cr/L.

Comparative Example 3

Contacting a Chromium-Containing Solution with Untreated Ferrosoferric Oxide Particles About 1 g of the untreated ferrosoferric oxide black particles of Example 1 was used as received, i.e., the particles were not treated as described in Example 1.

The untreated ferrosoferric oxide black particles were contacted with about 10 mL of aqueous $CrO_3$ contaminant solution 2, containing about 660 mg Cr/L water, at about the same temperature and for about the same amount of time as the contact occurred in Example 2. Before and after being contacted with the untreated ferrosoferric oxide black particles, the contaminant solution appeared yellow in color, indicating that these particles were ineffective in removing chromium from contaminant solution 2 as little, if any, color change occurred.

Comparative Example 4

Contacting a Chromium-Containing Solution with $NaBH_4$

About 10 mL of a 1 M $NaBH_4$ solution, containing about 380 mg of $NaBH_4$, was contacted with about 10 mL of the $CrO_3$ contaminant solution 2 of Example 3, containing about 660 mg Cr/L water. Before being contacted with the $NaBH_4$ solution, the $CrO_3$ contaminant solution 2 appeared yellow in color. After being contacted with the NaBH solution at about the same temperature and for about the same amount of time as the contact occurred in Example 2, the contaminant solution remained yellow in color but appeared to be less yellow in color than the starting contaminant solution 2, and the solution became cloudy, a precipitate formed, and the precipitated settled out of the solution. That little color change occurred indicates that $NaBH_4$ was ineffective in removing chromium from contaminant solution 2.

Example 5

Preparation of Ferric Trioxide Treated with Iron

This example provides, e.g., iron-treated ferric trioxide particles and a method for making the same by treating ferric trioxide particles with iron.

The materials described in Example 1 were used except that the ferrosoferric oxide black particles were replaced by 9 g of ferric trioxide ($Fe_2O_3$) particles (obtained from Spectrum Chemicals). The procedure described in Example 1 was followed.

About 10 g of iron-treated ferric trioxide particles were produced. Without wishing to be bound by theory, it is thought that iron deposition occurred on the $Fe_2O_3$ particles.

As determined from stoichiometry, the product particles contained about 90 wt. % $Fe_2O_3$ and about 10 wt. % supported iron and had activity for, e.g., removing chromium from a $CrO_3$ solution, as described in the following example.

Example 6

Contacting a Chromium-Containing Solution with the Example 5 Particles

About 40 mL of the dispersion of Example 5, containing about 1 g of particles, was contacted with about 20 mL of aqueous $CrO_3$ contaminant solution 1 of Example 2, containing about 725 mg Cr/L water.

Before being contacted with the metal-treated particles of Example 5, the $CrO_3$ contaminant solution 1 appeared yellow in color. At about 25° C., after being in contact with the metal-treated particles of Example 5 for less than 15 minutes, the contaminant solution appeared clear in color, indicating by the color change that the majority of chromium had been removed from contaminant solution 1 by the metal-treated particles. Pursuant to Example 10 below, it was determined that a similar clear-colored solution, previously containing chromium, had a chromium level lower than 0.05 mg Cr/L.

Comparative Example 7

Contacting a Chromium-Containing Solution with Untreated Ferric Trioxide Particles About 2 g of ferric trioxide particles of Example 5 was used as received, i.e., the particles were not treated as described in Example 5.

The untreated ferric trioxide particles were contacted with about 20 mL of the $CrO_3$ contaminant solution 1 of Example 2, containing about 725 mg Cr/L water, at about the same temperature and for about the same amount of time as the contact occurred in Example 6. Before and after being contacted with the untreated ferric trioxide particles, the contaminant solution appeared yellow in color, indicating that these particles were ineffective in removing chromium from contaminant solution 1 as little, if any, color change occurred.

Example 8

Contacting a Copper-Containing Solution with Treated Ferrosoferric Oxide Particles An aqueous dispersion of ferrosoferric oxide particles previously treated in a manner similar to Example 1, containing from about 20 g to about 50 g of particles, was contacted at about 25° C. with about 10 mL of an aqueous $CuSO_4$ contaminant solution 3, i.e., a solution containing about 965 g (34 ounces) of $CuSO_4$/L water (384 g of Cu/L water), acidified with 3.2% by volume sulfuric acid then adjusted to a pH of about 7.5 by the addition of an NaOH solution.

Before being contacted with the metal-treated particles, the copper-containing contaminant solution 3 appeared blue in color. After being in contact with the metal-treated particles for less than 10 minutes, the contaminant solution appeared clear in color, indicating by the color change that the majority of copper had been removed from contaminant solution 3 by the metal-treated particles.

Example 9

Preparation of Ferrous/Ferric Oxides Treated with Iron and Containing a Dispersant This example demonstrates that a dispersant or a protective colloid, e.g., food-grade methyl cellulose, can be used to delay settling of the dispersion and help maintain the iron-treated particles dispersed during storage and use.

Into a 500 mL transparent plastic bottle was added 400 mL of an aqueous solution of 20 g methyl cellulose/L. The food-grade methyl cellulose was obtained from Spectrum Chemicals. About 10 g of the previously-washed iron-treated particles of Example 1 were placed in contact with this solution. At about 25° C., the particles and solution were mixed for about 5 minutes in a HAMILTON-BEACH blender modified to comprise a propeller-type mixer and operated at about 625 rpm. After mixing was stopped the dispersion was returned to the bottle and allowed to stand. Almost one hour elapsed before substantially all of the particles settled to the bottom of the bottle.

In contrast, for a control prepared as described above but without methyl cellulose, only about 10 minutes elapsed before substantially all of the particles settled to the bottom of the bottle.

Without wishing to be bound by theory, it is thought that the presence of a dispersant enhances, e.g., the decontamination-ability of the metal-treated particles of the invention when contacting contaminated soil.

Example 10

Contacting a Chromium-Containing Solution with the Example 9 Particles

A portion of the dispersion of Example 9, containing about 1 g of particles, was contacted at about 25° C. with the aqueous $CrO_3$ contaminant solution 2 of Example 3 that was determined to contain 660 mg Cr/L water by the EPA 200.7 method, which uses inductively coupled plasma-atomic emission spectroscopy (ICP-AES) chromium detection. (Regarding the EPA 200.7 method, see, e.g., EPA-821-R-01-010, "Trace Elements in Water, Solids, and Biosolids by Inductively Coupled Plasma-Atomic Emission Spectrometry," Revision 5.0, January 2001, U.S. Environmental Protection Agency, Office of Science and Technology.) Before being contacted with the metal-treated particles of Example 9, the $CrO_3$ contaminant solution 2 appeared yellow in color. After 40 mL of the dispersion of Example 9 and 10 mL of the contaminant solution 2 were in contact for about 15 minutes, the contaminant solution appeared to be turbid and was observed to be substantially clear in color. The level of chromium in the turbid product was reduced to lower than the ICP-AES method's chromium detection level, i.e., was lower than 0.05 mg Cr/L, indicating that the much of the chromium had been removed from contaminant solution 2 by the metal-treated particles of Example 9.

Example 11

Contacting a Chromium-Containing Solution with the Example 9 Particles

At about 25° C., approximately a 40 mL portion of the concentrated dispersion of Example 9 was added to 1 L of water, thereby forming a working-strength dispersion from the Example 9 concentrate.

At about 25° C., about 1 L of the working-strength dispersion was contacted with from about 10 mL to about 20 mL of the aqueous $CrO_3$ contaminant solution 2 of Example 3, containing about 660 mg Cr/L water.

Before being contacted with the working-strength dispersion, the $CrO_3$ contaminant solution 2 appeared yellow in color. After being in contact with the working-strength dispersion for less than 15 minutes, the contaminant solution appeared clear in color and slightly turbid, indicating by the color change that the majority of chromium had been removed from contaminant solution 2 by the metal-treated particles of the working-strength dispersion. Pursuant to Example 10 above, it was determined that a similar clear-colored solution, previously containing chromium, had a chromium level lower than 0.05 mg Cr/L.

Example 12

Preparation of Diatomite Treated with Iron

This example provides, e.g., iron-treated diatomite particles and a method for making the same by treating diatomite with iron.

The diatomite used was obtained from the General Filtration Company. The grade used was SPEEDPLUS, having a loose density of about 160 kg/m³ and a specific gravity of about 2.35 based on information from the supplier.

The procedure described in Example 1 was followed except that 5.8 g of anhydrous $FeCl_3$ was added to the water and dissolved, then 9 g of the SPEEDPLUS diatomite was added to form a suspension. Thereafter, 6.5 g of $NaBH_4$, dissolved in 200 mL of water, was dripped into the suspension over a 1.5 hour period. About 11 g of iron-treated diatomite particles were produced. As determined from stoichiometry, the product particles contained about 81.8 wt. % diatomite and about 18.2 wt. % supported iron. Like the treated ferrosoferric oxide black particles of Example 1, the metal-treated diatomite particles of this example had activity for, e.g., removing chromium from a $CrO_3$ solution, as described in the following example.

Example 13

Contacting a Chromium-Containing Solution with the Example 12 Particles

About 40 mL of the dispersion of Example 12, containing about 880 mg of metal-treated particles, was contacted at about 25° C. with 20 mL of aqueous $CrO_3$ contaminant solution 1 of Example 2, the latter containing about 725 mg Cr/L water. Before being contacted with the metal-treated particles of Example 12, the $CrO_3$ contaminant solution 1 appeared yellow in color. After being in contact with the metal-treated particles of Example 12 for about 30 minutes, the contaminant solution appeared clear in color, indicating by the color change that the majority of chromium had been removed from contaminant solution 1 by the metal-treated diatomite particles.

Example 14

Preparation of Perlite Treated with Iron

This example provides, e.g., iron-treated perlite particles and a method for making the same by treating diatomite with iron.

The perlite used was obtained from the General Filtration Company. The grade used was no. 416, having a loose density of about 88 kg/m³ and a specific gravity of about 2.3 based on information from the supplier.

The procedure described in Example 12 was followed except that the SPEEDPLUS diatomite was replaced by 9 g of no. 416 grade perlite.

Example 15

Preparation of Kilogram Quantities of Ferrous/Ferric Oxides Treated with Iron

This example provides, e.g., a method for making about 4.5 kg iron-treated ferrous/ferric oxide particles by treating ferrous/ferric oxide particles with iron.

A 208.5 L (55 gallon) tank equipped with a direct drive mixer operating at about 1,725 rpm was used. About 113.7 L (30 gallons) of water was introduced into the tank. With constant mixing, the following approximate amounts of ingredients, as described in Example 1, were added:
  4.07 kg (9.0 lb) of ferrosoferric oxide particles, and
  1.27 kg (2.9 lb) of $FeCl_3$.
The temperature was about 25° C. throughout this example. About 1.46 kg (3.25 lb) of $NaBH_4$ was dissolved in about 56.9 L (15 gallons) of water to form a second solution. This second solution was slowly fed, over a period of about 2.5 hours, into the 208.5 L tank containing ferrosoferric oxide particles and $FeCl_3$. After about 15-20 minutes, the metal-treated particles were recovered by transferring the dispersion, which had a pH of about 9, to a 246 L (65 gallon) cylindrical tank with a conical-shaped bottom, allowing the metal-treated particles to settle into the conical portion, and draining off the supernatant liquid. While stirring, the recovered particles were washed three times with about 152 L (40 gallons) of water for each rinse.

About 4.5 kg (about 10 lb) of iron-treated ferrosoferric oxide particles, dispersed in water, were produced; the volume of dispersion produced was about 75.8 L (20 gallons). As determined from stoichiometry, the product particles contained about 90 wt. % $Fe_3O_4$ and about 10 wt. % supported iron and had activity for, e.g., removing chromium from a $CrO_3$ solution, as described in the following example.

Example 16

Contacting a Chromium-Containing Solution with the Example 15 Particles

About 17 mL of the dispersion of Example 15, containing about 1 g of metal-treated particles, were contacted at about 25° C. with a total of about 30 mL of the aqueous $CrO_3$ contaminant solution 1 of Example 2, containing about 725 mg Cr/L water, added in three 10 mL aliquots. Upon addition of each aliquot, the fluid was stirred for about 1 minute then allowed to stand.

Before being contacted with the metal-treated particles of Example 15, the $CrO_3$ contaminant solution 1 appeared yellow in color. After being in contact with the metal-treated particles of Example 15 for less than 15 minutes, the first 10 mL portion of the contaminant solution appeared clear in color, indicating by the color change that the majority of chromium had been removed from the first aliquot of contaminant solution 1 by the metal-treated particles. Pursuant to Example 10 above, it was determined that a similar clear-colored solution, previously containing chromium, had a chromium level lower than 0.05 mg Cr/L.

The supernatant was decanted, then a second 10 mL portion of aqueous $CrO_3$ contaminant solution 1 was added to the about 1 g of metal-treated particles. Again, after being in contact with the metal-treated particles of Example 15 for less than 15 minutes, the second 10 mL portion of the contaminant solution appeared clear in color, indicating by the color change that the majority of chromium had been removed from the second aliquot of contaminant solution 1 by the metal-treated particles.

Again the supernatant was decanted, then a third 10 μL portion of aqueous $CrO_3$ contaminant solution 1 was added to the about 1 g of metal-treated particles. Again, after being in contact with the metal-treated particles of Example 15 for less than 15 minutes, the third 10 mL portion of the contaminant solution appeared clear in color, indicating by the color change that the majority of chromium had been removed from the third aliquot of contaminant solution 1 by the metal-treated particles.

Example 17

Preparation Polymetallic-Treated Ferrosoferric Oxide Particles

This example provides, e.g., polymetallic-treated ferrosoferric oxide particles and a method for making the same by treating ferrosoferric oxide particles with a plurality of metals.

The procedure described in Example 1 was followed except that, in place of the 18 mL of 1 M $FeCl_3$ solution, the following approximate amounts of ingredients were added to 800 mL of water:

1.5 g of nickel acetate (anhydrous, obtained from Enequist, Brooklyn, N.Y.),
9 mL of 1 M $FeCl_3$ (containing 1.5 g anhydrous $FeCl_3$), and
1 mL of 0.1 M $PdCl_2$ (containing 17.7 mg anhydrous $PdCl_2$; obtained from Enthone (West Haven, Conn.).

1.5 g of anhydrous nickel acetate was added to the water and dissolved, followed by the addition of the $FeCl_3$ solution and the $PdCl_2$ solution.

About 10 g of polymetallic-treated ferrosoferric oxide particles were produced. As determined from stoichiometry, the product particles contained about 90 wt. % ferrosoferric oxide particles, about 5 wt. % supported iron, about 4.9 wt. % supported nickel, and about 0.1 wt. % supported palladium. The polymetallic-treated particles of this example had activity for, e.g., removing chromium from a $CrO_3$ solution, as described in the following example.

Example 18

Contacting a Chromium-Containing Solution with the Example 17 Particles

About 40 mL of the dispersion of Example 17, containing about 1 g of polymetallic-treated particles, was contacted with about 40 mL of aqueous $CrO_3$ contaminant solution 1 of Example 2, containing about 725 mg Cr/L water.

Before being contacted with the polymetallic-treated particles of Example 17, the $CrO_3$ contaminant solution 1 appeared yellow in color. At about 25° C., after being in contact with the polymetallic-treated particles of Example 17 for less than 15 minutes, the contaminant solution appeared clear in color, indicating by the color change that the majority of chromium had been removed from contaminant solution 1 by the polymetallic-treated particles. Pursuant to Example 10 above, it was determined that a similar clear-colored solution, previously containing chromium, had a chromium level lower than 0.05 mg Cr/L.

Example 19

Remediation of PCB-Contaminated Soil with the Example 1 Particles

In the laboratory, samples of contaminated soil (each about 4.5 kg) containing about 42 mg PCBs/kg soil were admixed with 1.36 kg of the dispersion in Example 1, containing about 0.23 kg of particles, and agitated. The following PCB concentrations were measured in the soil after various contact times with metal-treated particles of Example 1.

| Days Elapsed | Approximate PCB Concentration, mg PCB/kg | % Reduction in PCB Concentration |
|---|---|---|
| 0 | 42 | — |
| 1 | 25 | 40 |
| 13 | 13 | 69 |
| 60 | 3.5 | 92 |

Example 20

Remediation of Perchlorate-Contaminated Groundwater with the Example 1 Particles In the laboratory, about 2.5 grams of particles of Example 1 were combined with 200 mL of groundwater contaminated with 10 mg/L of perchlorate. After a 3 hour contact time, the metal-treated particles were removed by filtering and the perchlorate concentration was measured as 8.7 mg/L, a reduction in perchlorate concentration of 13% in this short time period.

All publications and patent applications are herein incorporated by reference to the same extent as if each individual publication or patent application was specifically and individually indicated to be incorporated by reference.

Unless otherwise noted, all percent and parts values given herein are by weight, i.e., weight percent (wt. %) and parts by weight.

While it is apparent that the invention herein disclosed is well calculated to fulfill the objects above stated, it will be appreciated that numerous modifications and embodiments may be devised by those skilled in the art. It is intended that the appended claims cover all such modifications and embodiments as fall within the true spirit and scope of the present invention.

What is claimed is:

1. A method for preparing a metal-treated particle, comprising:
   providing a plurality of cores having an average largest transverse dimension of from about 5 nanometers to about 1100 nanometers, at least one metal-supplying agent and an alkali metal hydride reductant capable of reducing the metal-supplying agent;
   contacting the at least one metal-supplying agent and the reductant in the presence of the cores to form at least one metal-treated particle by chemical reduction of the metal-supplying agent to deposit the metal on surfaces of the cores; and
   recovering the at least one metal-treated particle, wherein a total amount of metal in each metal-treated particle is from about 8% to about 22% by weight based on a total weight of each metal-treated particle and a surface area of the at least one metal-treated particle is from about 35 m²/g to about 60 m²/g.

2. The method of claim 1, wherein each core is one of ferrosoferric oxide and ferric trioxide.

3. The method of claim 2, wherein the at least one metal-supplying agent comprises a transition metal halide, a transition metal sulfate, a transition metal acetate, a hydrate thereof, or any mixture thereof, and wherein the transition metal halide is ferric chloride, ferrous chloride, cupric chloride, cobaltous chloride, nickelous chloride, ferric bromide, ferrous bromide, cupric bromide, cobaltous bromide, nickelous bromide, ferric iodide, ferrous iodide, cupric iodide, cobaltous iodide, nickelous iodide, a hydrate thereof, or any mixture thereof.

4. The method of claim 3, wherein the transition metal acetate is ferric acetate, ferrous acetate, cupric acetate, cobaltous acetate, nickelous acetate, a hydrate thereof, or any mixture thereof.

5. The method of claim 3, wherein the transition metal halide is ferric chloride.

6. The method of claim 1, wherein the reductant comprises a mixture of an alkali metal hydride with an alkali metal azide or a hydrazine.

7. The method of claim 6, wherein the reductant is sodium borohydride, potassium borohydride, lithium borohydride, or a mixture thereof with sodium azide, potassium azide, hydrazine, or hydrazine hydrate.

8. The method of claim 7, wherein the reductant is sodium borohydride.

9. The method of claim 7, wherein the contacting occurs in a fluid medium.

10. The method of claim 9, wherein the fluid medium comprises water, the at least one metal-supplying agent is ferric chloride, each core is ferrosoferric oxide, and the reductant is sodium borohydride, the contacting further comprising:

adding the ferric chloride to the water while stirring the water;

adding the ferrosoferric oxide to the water to form a suspension, such that a weight ratio of the ferrosoferric oxide to the ferric chloride in the water is approximately 3:1; and adding the sodium borohydride to the suspension gradually over a 1-2 hour period, such that a weight ratio of the added sodium borohydride to the ferric chloride is at least approximately 1.1:1.

11. The method of claim 9, wherein providing the reductant comprises slowly adding the reductant to the fluid medium over a period in excess of one hour.

12. The method of claim 11, further comprising adding a food-grade dispersant to fluid medium, the metal-treated particle contacting the dispersant.

13. The method of claim 1, wherein the at least one metal-supplying agent comprises a plurality of metal-supplying agents and the metal-treated particle comprises a plurality of metals associated with the plurality of metal-supplying agents.

14. The method of claim 13, wherein the plurality of metal-supply agents comprises nickel acetate, $FeCl_3$, and $PdCl_2$.

15. The method of claim 1, wherein the reductant comprises a finely-divided solid.

16. The method of claim 1, wherein the metal-treated particle is recovered using vacuum filtration.

17. The method of claim 1, wherein the contacting occurs in an anhydrous fluid.

18. The method of claim 1, wherein each core is diatomite.

19. The method of claim 1, wherein each core is perlite.

20. The method of claim 1, further comprising depositing a noble metal on the metal-treated particle.

21. The method of claim 1, wherein a temperature throughout the method is maintained from about 15° C. to about 30° C.

* * * * *